United States Patent
Merkel et al.

(10) Patent No.: US 9,845,110 B2
(45) Date of Patent: Dec. 19, 2017

(54) HEAVY ROAD VEHICLE WITH NORMAL STEERING AND CRAB STEERING

(71) Applicant: GOLDHOFER AG, Memmingen (DE)

(72) Inventors: Felix Merkel, Memmingen (DE); Benjamin Scholl, Finning (DE)

(73) Assignee: GOLDHOFER AG, Memmingen (DE)

( * ) Notice: Subject to any disclaimer, the term of this patent is extended or adjusted under 35 U.S.C. 154(b) by 0 days.

(21) Appl. No.: 14/432,947

(22) PCT Filed: Oct. 1, 2013

(86) PCT No.: PCT/EP2013/070435
§ 371 (c)(1),
(2) Date: Apr. 1, 2015

(87) PCT Pub. No.: WO2014/053478
PCT Pub. Date: Apr. 10, 2014

(65) Prior Publication Data
US 2015/0266505 A1    Sep. 24, 2015

(30) Foreign Application Priority Data
Oct. 2, 2012   (DE) .................. 10 2012 218 045

(51) Int. Cl.
*B62D 7/14*     (2006.01)
*B62D 7/15*     (2006.01)
*B62D 5/06*     (2006.01)

(52) U.S. Cl.
CPC .......... *B62D 7/1509* (2013.01); *B62D 7/144* (2013.01); *B62D 7/1518* (2013.01); *B62D 5/06* (2013.01)

(58) Field of Classification Search
CPC ...... B62D 7/15; B62D 7/1509; B62D 7/1518; B62D 7/1536; B62D 7/1545; B62D 7/142; B62D 7/144; B62D 13/04
See application file for complete search history.

(56) References Cited

U.S. PATENT DOCUMENTS 1,835,112 A  * 12/1931  Hawkins ................ B60G 5/01
                                                    180/14.1
3,680,653 A     8/1972  Murata
(Continued)

FOREIGN PATENT DOCUMENTS

| CN | 1730824 | 2/2006 |
| CN | 102019958 | 4/2011 |

(Continued)

OTHER PUBLICATIONS

PCT Search Report for PCT/EP2013/070435.
(Continued)

*Primary Examiner* — Joseph M Rocca
*Assistant Examiner* — Maurice L Williams
(74) *Attorney, Agent, or Firm* — Greenblum & Bernstein, P.L.C.

(57) ABSTRACT

The invention relates to a heavy goods vehicle in which the steering system (12) comprises, in addition to a normal steering mode steering device (26) that transfers steering power purely mechanically by means of connecting rods (34) from axle to axle, a crab steering mode steering device (28) that also transfers steering power purely mechanically by means of connecting rods (46) from axle to axle. The individual wheel assemblies (14, 16, 18, 20, 22, 24) can be connected by means of coupling devices (56) either to the normal steering mode steering device (26) or to the crab steering mode steering device (28).

18 Claims, 12 Drawing Sheets

(56) References Cited

U.S. PATENT DOCUMENTS

| | | | | |
|---|---|---|---|---|
| 3,903,979 | A | | 9/1975 | Perrotin |
| 4,090,581 | A | * | 5/1978 | Miner ................. B62D 5/06 180/403 |
| 4,943,078 | A | * | 7/1990 | McGhie ............. B60G 21/06 280/405.1 |
| 5,217,083 | A | * | 6/1993 | Bachhuber .......... B62D 7/1509 180/415 |
| 5,570,754 | A | * | 11/1996 | Stimson ............. A01B 51/026 180/167 |
| 5,996,722 | A | * | 12/1999 | Price .................. B62D 7/1509 180/234 |
| 6,059,056 | A | * | 5/2000 | Becker ................ B62D 7/1509 180/24.01 |
| 6,354,394 | B1 | * | 3/2002 | Bauer-Nilsen ........ B62D 7/026 180/408 |
| 2002/0175009 | A1 | | 11/2002 | Kress |
| 2003/0218374 | A1 | | 11/2003 | Kress |
| 2009/0236823 | A1 | * | 9/2009 | Prem ................... B62D 13/005 280/426 |
| 2010/0126790 | A1 | | 5/2010 | Terry |
| 2015/0076783 | A1 | | 3/2015 | Swoboda |

FOREIGN PATENT DOCUMENTS

| | | |
|---|---|---|
| CN | 103057621 | 4/2013 |
| DE | 19 43 604 | 3/1970 |
| DE | 23 32 243 | 7/1974 |
| DE | 10 2012 205 641 | 10/2013 |
| EP | 1 577 159 | 9/2005 |
| FR | 2 540 812 | 8/1984 |
| WO | WO 09/53526 | 4/2009 |

OTHER PUBLICATIONS

German Office Action in DE 10 2012 218 045.1.
PCT Written Opinion in the English language for PCT/EP2013/070435.
Chinese Office Action dated Apr. 15, 2016 (19 pages).

* cited by examiner

HEAVY ROAD VEHICLE WITH NORMAL STEERING AND CRAB STEERING

DESCRIPTION

The invention relates to a heavy goods vehicle, comprising
- a plurality of axles, each of which comprises at least one left wheel assembly and at least one right wheel assembly,
- a steering system, which is configured so that it enables both a normal steering mode, in which the left wheel assemblies and the right wheel assemblies each have a steering angle that is dependent on the position of the respective axle in the longitudinal direction of the vehicle, the wheel assemblies of adjacent axles having a different steering angle from one another, and a crab steering mode, in which the wheel assemblies assigned to the plurality of axles all have the same steering angle.

The term "heavy goods vehicle" in the present invention relates to both self-propelled heavy goods vehicles and heavy goods trailers.

Heavy goods trailers or "trailers for transporting heavy loads" as defined in Annex XI of EU Guideline 2007-46-EC in the version dated 15 Jul. 2011 are class $O_4$ vehicles according to the definition of this term therein for the transportation of indivisible loads (for example the rotor blades of wind turbines), which are subject to speed and traffic restrictions because of their dimensions. A similar definition also applies to self-propelled heavy goods vehicles.

The heavy goods trailer according to the invention can be both a heavy goods trailer with a drawbar and a heavy goods semitrailer. In addition, the heavy goods trailer according to the invention can have a modular structure regardless of the number of modules.

If one of the modules of such a modular heavy goods trailer is equipped with a "power pack", in which a combustion engine with a hydraulic pump is arranged, which pump provides the hydraulic volumetric flow for driving the hydraulic motors of the drive axles of the modules, in this way a modular self-propelled vehicle can be formed from a trailing modular vehicle.

Furthermore, it should be noted that in connection with the present invention an "axle" does not necessarily have to be a real, i.e. physically existing, axle, as in the example of the rigid axle, but can also denote a virtual axis, which is formed in that the left wheel assembly and the right wheel assembly are arranged relative to the longitudinal axis of the vehicle substantially at the same "height" (i.e. a plane in which both steering rotary axles of the left and right wheel assemblies are orthogonal to the longitudinal axis of the vehicle).

When the term "wheel assembly" is used in connection with the present invention it denotes the wheel assigned to one side of the vehicle or the wheels of the respective vehicle axle assigned to one side of the vehicle and steered together, as well as their respective connection to the vehicle frame. Each wheel can be fitted with one, two or even more tyres.

The steering of a generic heavy goods vehicle needs to fulfil many requirements. On the one hand the vehicle has to be roadworthy and therefore satisfy the relevant legal requirements, for example the European regulations on motor vehicles and their trailers (ECE Regulations) and German road traffic licensing regulations (StVZO). This is made possible by means of a normal steering mode which meets said requirements and determines the steering angle of the individual wheel assemblies, for example according to the Ackermann principle. In the purest form of the Ackermann principle the steering angle of each individual wheel assembly is adjusted so that ideally the extensions of the wheel axles of all wheel assemblies meet at a single point, the distance of said point from the vehicle longitudinal axis determining the radius of the curve along which vehicle is currently driving. In practice however the Ackermann principle is often approximated in that the wheel assemblies belonging to the same axle are adjusted to the same steering angle and the steering angle of the different axles is selected according to the Ackermann principle.

However, said normal steering mode is often not suitable for manoeuvring at the destination point. Therefore, the vehicle also needs a crab steering mode, in which all of the wheel assemblies of all axles are steered by the same steering angle to enable parallel movements of the vehicle.

The solutions that have been proposed in the prior art so far all have the disadvantage that they are too expensive either in terms of their structure or control technology or do not meet the relevant legal requirements. For example, to transfer the steering powers from axle to axle the connecting elements can be designed to be adjustable in length by means of adjusting units, a control device influencing the length of the individual connecting elements in order to achieve the desired steering mode.

The object of the invention is therefore to develop the generic heavy goods vehicle such that it provides the normal steering mode and the crab steering mode in a structurally simple manner and such that the steering also satisfies the requirements of the relevant legal regulations.

Said object is achieved according to the invention by a generic heavy goods vehicle, in which the steering system comprises for each axle at least one rotary steering element which is rotatable about an axis of rotation and is in steering connection with the at least one left wheel assembly and/or the at least one right wheel assembly of the axle, and for each steering rotary element comprises a normal steering mode steering power introduction unit assigned thereto, and for each steering rotary element comprises a crab steering mode steering power introduction unit assigned thereto, and for each steering rotary element comprises a coupling device which connects the steering rotary element in a rotationally engaged manner either to the normal steering mode steering power introduction unit or to the crab steering mode steering power introduction unit, the steering system also comprising at least one normal steering mode connecting element which interconnects the normal steering mode steering power introduction units of axles that are adjacent to one another in the longitudinal direction of the vehicle, at least one crab steering mode connecting element which interconnects the crab steering mode steering power introduction units of axles that are adjacent to one another in the longitudinal direction of the vehicle, and comprises at least one power device which is arranged on the vehicle and is connected to at least one of the steering power introduction units and provides the steering power.

According to the invention, the steering system of the heavy goods vehicle thus has two separate steering devices, namely a normal steering mode steering device and a crab steering mode steering device, wherein in the two steering devices, the steering power is transferred purely mechanically by means of the connecting elements from axle to axle. According to the invention, the connecting elements of the normal steering mode steering device and/or of the crab steering mode steering device are preferably designed to be rigid in operation. This means that their length does not change during the steering operation. This, however, does not preclude the fact that the length of the connecting elements can be changed as required to determine a desired steering behaviour prior to starting the steering operation.

By means of the at least one coupling device it is possible to switch back and forth between the normal steering mode and the crab steering mode. This simplifies not only the structure of the steering system and thus also the activation of both steering mode types but also satisfies the relevant legal requirements.

Although constructions which are based on the use of gear racks which can be moved in the longitudinal direction of the heavy goods vehicle are also possible in principle, the movement of which of pinions or pinion assemblies is picked up and transferred to the steering rotary element, wherein the gear racks take over the function of the connecting elements and the pinions or pinion assemblies take over the function of the steering power introduction units, it is proposed according to the invention that the normal steering mode steering power introduction unit comprises a normal steering mode rotary element that is assigned to each steering rotary element, that the crab steering mode steering power introduction unit comprises a crab steering mode rotary element that is assigned to each steering rotary element, and that the coupling device connects the steering rotary element either to the normal steering mode rotary element or to the crab steering mode rotary element in a rotationally engaged manner. This construction has the advantage compared with the construction based on gear racks of having a simpler structure and thus being less expensive to produce and less susceptible to soiling.

Preferably, both the normal steering mode rotary element and the crab steering mode rotary element are arranged such that they are rotatable about the axis of rotation of the steering rotary element.

As known per se from the normal steering mode steering device of modular vehicles of the applicant, the steering angles required for the steered axles, more precisely their steering angle ratio, i.e., the ratio of the steering angle to an output variable of the power device, can be predetermined in that the free ends of the connecting elements are articulated on the respective normal steering mode rotary element at a predefined radial distance from the axis of rotation of the assigned steering rotary element. The same construction principle can advantageously also be used in the crab steering mode steering device of the heavy goods vehicle according to the invention, that is to say that the free ends of the crab steering mode connecting elements are all articulated on the respective crab steering mode rotary element at the same radial distance from the axis of rotation of the assigned steering rotary element in order to achieve a steering angle translation ratio of 1:1 for all of them.

The steering system according to the invention can be used both in vehicles in the normal steering mode steering device of which a common steering rotary element is provided for both wheel assemblies belonging to the same axle (steering systems of this type are used for example in the heavy goods trailers and heavy goods semitrailers of the applicant: see for example DE 10 2012 205 641) and also in vehicles in which a separate steering rotary element is assigned to each wheel assembly (steering systems of this type are used for example in the modular vehicles of the applicant).

If the at least one steering rotary element, as known per se from the steering rotary elements of the modular vehicles of the applicant, is part of a rotary frame which also comprises a frame element which is operatively arranged on the frame of the vehicle, the steering rotary element being mounted on the frame element so as to be rotatable about its axis of rotation, said rotary frame can be modified to obtain the present invention such that it also comprises the normal steering mode rotary element and the crab steering mode rotary element, wherein the normal steering mode rotary element and the crab steering mode rotary element are mounted on the frame element so as to be rotatable indirectly or directly about the axis of rotation, for example by means of ball bearings. In this way the frame element can preferably be designed to be annular and connected to the vehicle frame for example by screwing. Furthermore, the normal steering mode rotary element and the crab steering mode rotary element can also be designed to be annular and can form, together with the steering rotary element and the frame element, a multiple rotary ring, preferably a multiple ball slewing ring.

To enable the transfer of the steering power from wheel assembly to wheel assembly it is proposed that the at least one normal steering mode steering power introduction unit has a normal steering mode steering lever to which the at least one normal steering mode connecting element is connected, and/or that the at least one crab steering mode steering power introduction unit has a crab steering mode steering lever to which the at least one crab steering mode connecting element is connected. In order to be able to protect the normal steering mode steering device and the crab steering mode steering device from external influences, in particular from damage caused by external influences, it is advantageous if the normal steering mode steering lever and the crab steering mode steering lever are arranged, when driving in a straight line, on the side of the steering rotary element pointing towards the vehicle longitudinal centre.

According to the already mentioned "gear rack alternative", the at least one normal steering mode steering power introduction unit and/or the at least one crab steering mode steering power introduction unit could also be configured to have a gear rim, which is in engagement with at least one connecting element in the form of a gear rack.

In one development of the invention it is proposed that the coupling device comprises an adjusting unit which is connected securely to the steering rotary element and a slide which can be displaced by means of the adjusting unit relative to the steering rotary element between a first position and a second position, wherein the slide comprises a first engaging section and a second engaging section, wherein the first engaging section, in the first position of the slide, is in steering power transmission engagement with one of the steering power introduction units, namely the normal steering mode steering power introduction unit or the crab steering mode steering power introduction unit, whereas the second engaging section, in the second position of the slide, is in steering power transmission engagement with the other steering power introduction unit, namely the crab steering mode steering power introduction unit or the normal steering mode steering power introduction unit. In this case the coupling device can be configured as a preassembled assembly and can for this purpose comprise a base element, for example, which can be operatively connected to the steering rotary element. Furthermore, the adjusting unit can be arranged securely on the base element and/or the slide can be guided movably on the base element. Furthermore, the adjusting unit can be a double-acting cylinder piston unit and/or proximity switches can be used to detect reaching the first and second positions.

If the at least one steering rotary element, as described above, is part of a rotary frame and is configured to be substantially annular, the coupling device can be arranged inside the steering rotary element ring. Here it is protected from external influences so that in particular it is possible to prevent damage caused by external influences. Furthermore, the coupling device can act in the axial direction and/or in the radial direction. In addition, it is possible that the coupling device comprises two separately configured coupling units which are, however, synchronised with respect to their mode, one of which is assigned to the normal steering mode steering power introduction unit and the other of which is assigned to the crab steering mode steering power introduction unit.

To enable the free movement of the two steering power introduction units relative to one another it is also possible that the slide comprises a recess adjacent to one of the two engaging sections, which recess enables the free movement of the other steering power introduction unit when said engaging section is in steering power transmission engagement with the assigned steering power introduction unit.

Independently of providing said recess the alternate engagement of the engaging sections with the two steering power introduction units can be achieved in a simple manner in terms of manufacture when the first engaging section and the second engaging section are arranged above one another in the vertical direction of the vehicle.

If the coupling device is arranged inside the annular steering rotary element and the two equally annular steering power introduction units are arranged coaxially with the steering rotary element, the recess in the slide can enable the free rotation of the radially inner steering power introduction unit when the slide is in steering power transmission engagement with the radially outer steering power introduction unit.

To be able to centre the respective steering power introduction unit relative to the slide it is proposed that at least one of the engaging sections is designed to have oblique faces which cooperate with corresponding counter oblique faces of the assigned steering power introduction unit. The steering power transmission engagement between the engaging section considered in this case and the assigned steering power introduction unit is thus substantially play-free.

In order to only have to assign one coupling device to each of the steering rotary elements it is an advantage if for the normal steering mode and the crab steering mode at least one power device is provided for generating the required steering power in each case.

In principle it is possible to generate the steering power required for the crab steering mode by means of a single power device. However, said device would have to be large enough to be able to provide the required power. Since it is not entirely simple to provide the installation space required for the additional crab steering device anyway, and it is simpler to accommodate a plurality of smaller power devices than one large one, it is proposed in a development that a separate power device for generating the steering power required for the crab steering mode be assigned to the left wheel assemblies of the vehicle and the right wheel assembles of the vehicle respectively. This embodiment is also desirable, irrespective of the problem of installation space, for vehicles in which a separate steering rotary element is assigned to each wheel assembly, for example the modular vehicles of the applicant. In addition, it has been shown that the power devices which are suitable for the practical realisation of the steering system according to the invention are able to provide a power which is sufficient for a predetermined maximum number of, for example four, wheel assemblies. For this reason, it is advantageous to provide a plurality of power devices for generating the steering power required for the crab steering mode. The synchronisation of the plurality of power devices can be carried out manually or mechanically or electronically or hydraulically in a force-controlled manner.

The power device can be for example a, preferably hydraulically actuated, cylinder piston unit. The fact that said unit can be actuated hydraulically is advantageous in particular in vehicles which are equipped with a "power pack" (as described above), since the hydraulic volumetric flow required to actuate the cylinder piston unit is provided by the "power pack".

In order to also be able to protect the cylinder piston unit against buckling when the piston rod is extended, it is proposed to mount the cylinder on the frame of the vehicle, adjacent to the piston rod outlet end thereof. The buckling length of the cylinder piston unit can thereby be reduced, and the forces acting on the piston rod seal can be kept to a minimum.

In order to be able to keep the forces acting on the piston rod seals to a minimum, additionally or alternatively, the free end of the piston rod can be connected to a guide block which is movably guided in a guide which is secured on the frame, wherein the guide block is preferably also connected to one end of a connecting rod, the other end of which is connected to the steering power introduction unit. In order to reduce the friction caused by the movement thereof in the guide, the guide block can also be formed having a plastics slide lining. A suitable plastics material is for example the slide bearing plastics material distributed under the trade name MURLUBRIC® by Murtfeld Kunststoffe GmbH & Co. KG, Dortmund. In order to even out wear on the guide block, it is also proposed to pivotally mount the cylinder of the cylinder piston unit on the frame of the vehicle relative thereto.

In order to be able to provide a satisfactory manoeuvring operation, it is sufficient for the wheel assemblies in the crab steering mode to be able to be steered over a steering angle range of from 0° (driving in a straight line) to 90° (moving sideways). In order to allow simple correctional movements, it is advantageous to extend said steering angle range at the upper limit of 90° and/or the lower limit of 0° by an additional steering angle range of 5° to 10°, so that the desired total steering angle range can extend between −5° to +95° and −10° to +100°.

However, it is also possible in principle for the steering angle range for the crab steering mode to extend between −90° and +90° or even between −180° and +180°. In order to make this possible, the power device for generating the crab steering mode steering power can be a hydraulic worm gear which meshes with a gear rim of the steering power introduction unit, and the at least one connecting element can be formed by an element which is flexible, but has an invariable length, for example a chain or a cable, in particular a steel cable. In this embodiment as well, the steering angle range can be increased by an additional steering angle range.

The invention is explained in more detail in the following by way of embodiments with reference to the accompanying drawings, in which.

In the following the structure and the function of the heavy goods vehicle according to the invention are explained with reference to an example of a module for a self-propelled or trailing modular vehicle.

Figure 1:
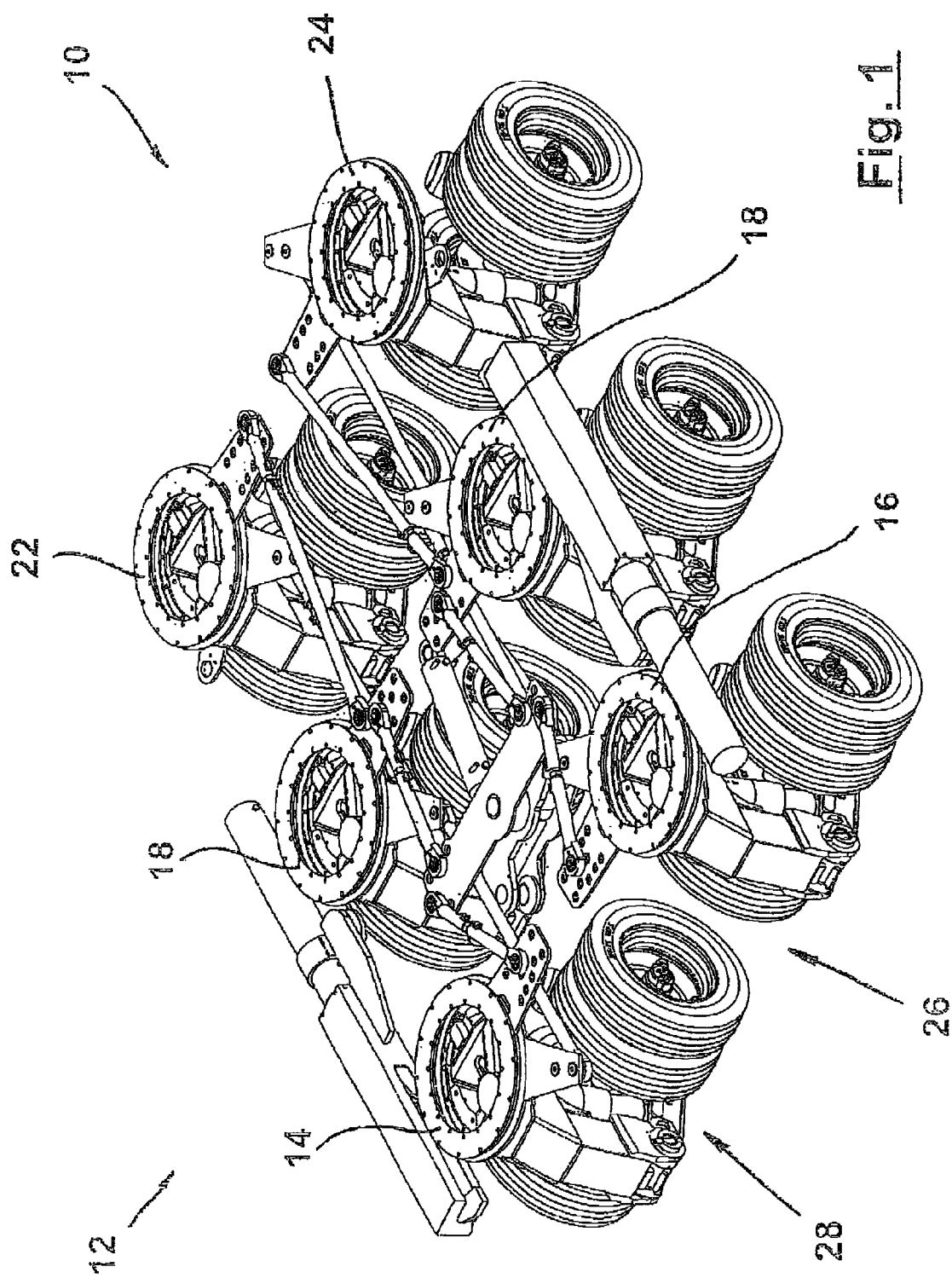
FIG. 1 is a perspective view of the steering system of a vehicle according to the invention, in which the vehicle is illustrated to facilitate the view of the steering system without a vehicle frame and other similar structures.
Figure 2:
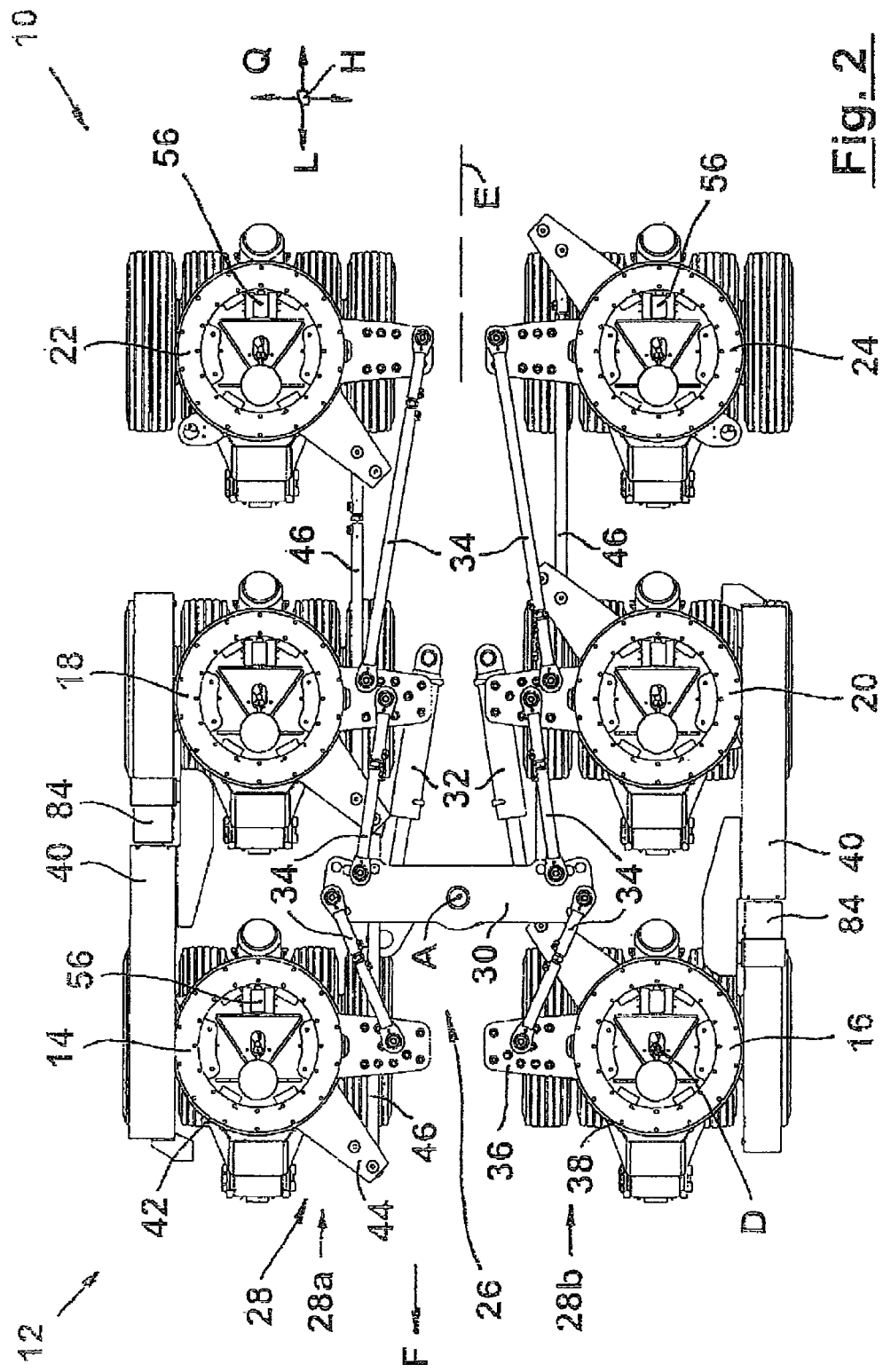
FIG. 2 is a plan view of the steering system according to FIG. 1.
Figure 3:
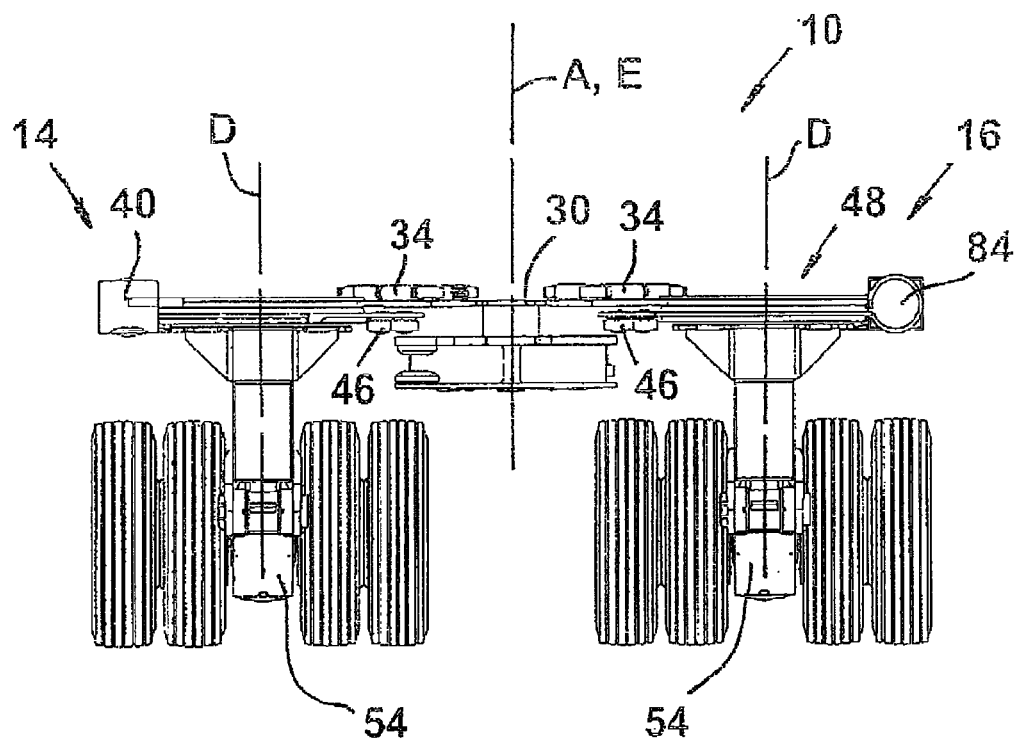
FIG. 3 is a front view of the steering system according to FIG. 1.

FIGS. 1 to 3 show a first embodiment of a heavy goods vehicle 10 according to the invention. To provide a better overview only the steering system 12 and the wheel assemblies 14, 16, 18, 20, 22 and 24 are shown, whilst the frame and other structures of the vehicle 10 arranged thereon are not shown. In this case, the wheel assemblies 14, 18, 22 are the right wheel assemblies in relation to the forwards driving direction F of the vehicle 10, whereas the wheel assemblies 16, 20, 24 are the left wheel assemblies. The wheel assemblies 14 and 16 belong to a front axle, the wheel assemblies 18 and 20 to a middle axle and the wheel assemblies 22 and 24 to a rear axle of the vehicle 10.

The steering system 12 comprises a normal steering mode steering device 26 which is configured and designed for driving the vehicle 10 on the public road network and a crab steering mode steering device 28 which is configured and designed for manoeuvring the vehicle 10.

Figure 14:
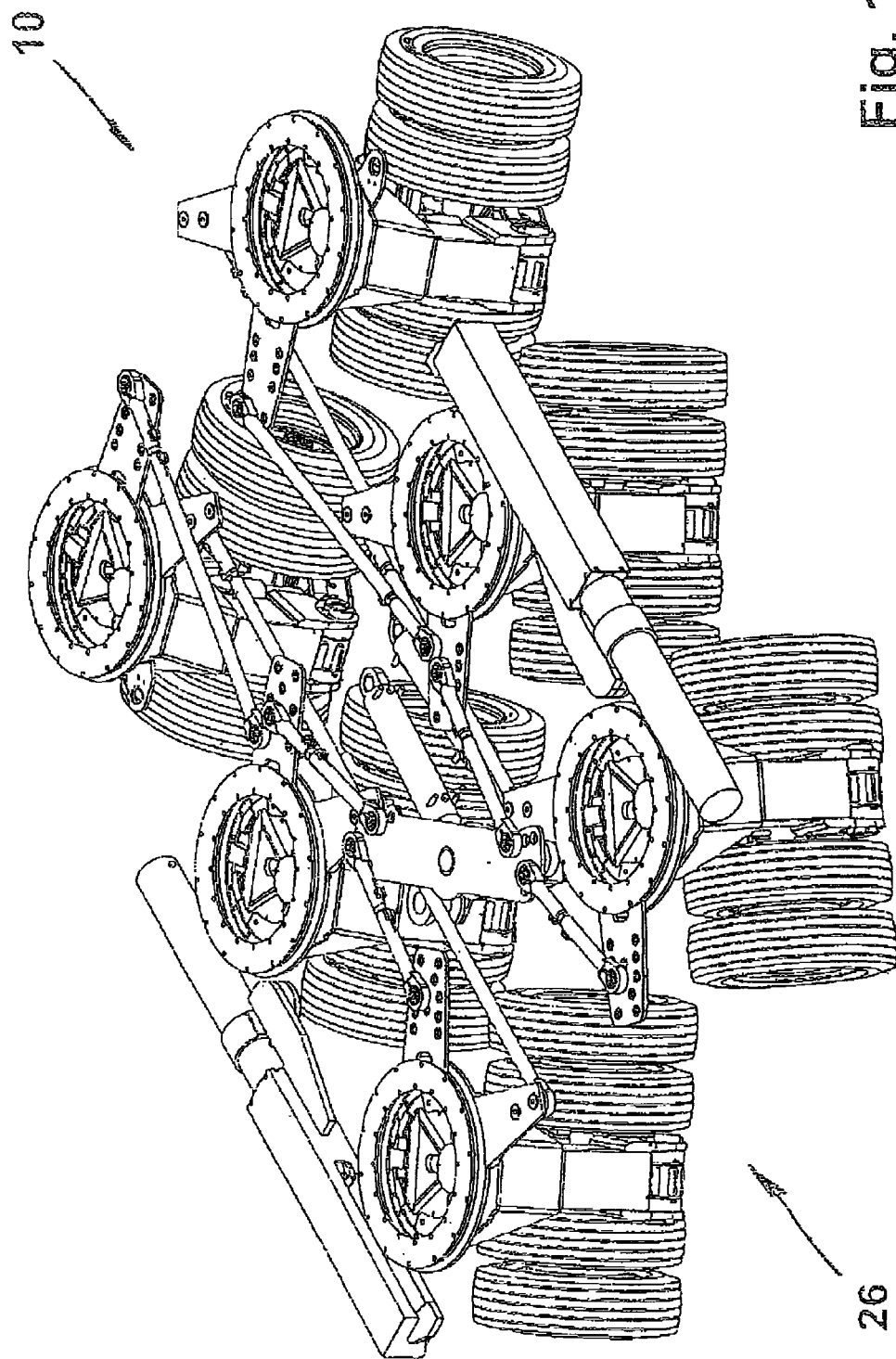
FIG. 14 is a perspective view similar to FIG. 1 in a steering position following a curve during the normal steering mode.

The normal steering mode steering device 26 comprises a pivoting plate unit 30, which can be pivoted by means of two power devices 32, which are formed for example by two hydraulically actuated cylinder piston units, about an axis A which is substantially parallel to the vertical axis H of the vehicle 10. Connecting rods 34 are articulated on the pivoting plate unit 30 and are articulated at their other end to steering levers 36 of steering power introduction units 38 of the wheel assemblies 14, 16, 18, 20. An additional connecting rod 34 connects the steering lever 36 of the steering power introduction units 38 of the wheel assemblies 18 and 22 or 20 and 24. As shown in particular in FIG. 2, the articulation points of the ends of the connecting rods 34 on the steering levers 36 have varying distances from the respective steering axis of rotation D of the associated wheel assemblies. In this way for each wheel assembly a predefined steering behaviour can be determined which is dependent on the steering angle of the pivoting plate unit 30. By selecting suitable distances said steering behaviour can be defined such that the vehicle 10 as a whole exhibits a steering behaviour according to the Ackermann principle (cf. FIG. 14).

According to the embodiment shown in FIGS. 1 to 3, the crab steering mode steering device 28 can be formed in separate parts, that is to say that a separate crab steering mode steering device 28*a* and 28*b* is provided for the right wheel assemblies 14, 18, 22 and the left wheel assemblies 16, 20, 24 respectively. Both are designed to be identical except for the fact that one is arranged in driving direction F, whereas the other is arranged in the opposite direction to driving direction F. Therefore, in the following, only the structure and the function of the crab steering mode steering device 28*a* for the right wheel assemblies 14, 18, 22 are described.

The crab steering mode steering device 28*a* comprises a power generation device 40 which is arranged on the outside of the vehicle 10 and is in steering power transmission engagement with the crab steering mode steering power introduction unit 42 of the wheel assembly 14. The exact structure of the power generation device 40 and the structural form of the steering power transmission engagement will be described in greater detail below. The steering power introduction units 42 also have steering levers 44 which are interconnected by means of connecting rods 46. As can be seen in FIG. 2, the two ends of the same connecting rod 46 are articulated on the steering levers 44 at the same distance from the steering axis of rotation of the respective wheel assemblies 14 and 18, and 18 and 22. This results in a 1:1 transmission of the steering angle from wheel assembly to wheel assembly so that all of the wheel assemblies always have the same steering angle. The synchronisation of the right wheel assemblies 14, 18, 22 with the left wheel assemblies 16, 20, 24 preferably takes place by means of control technology.

Figure 11:
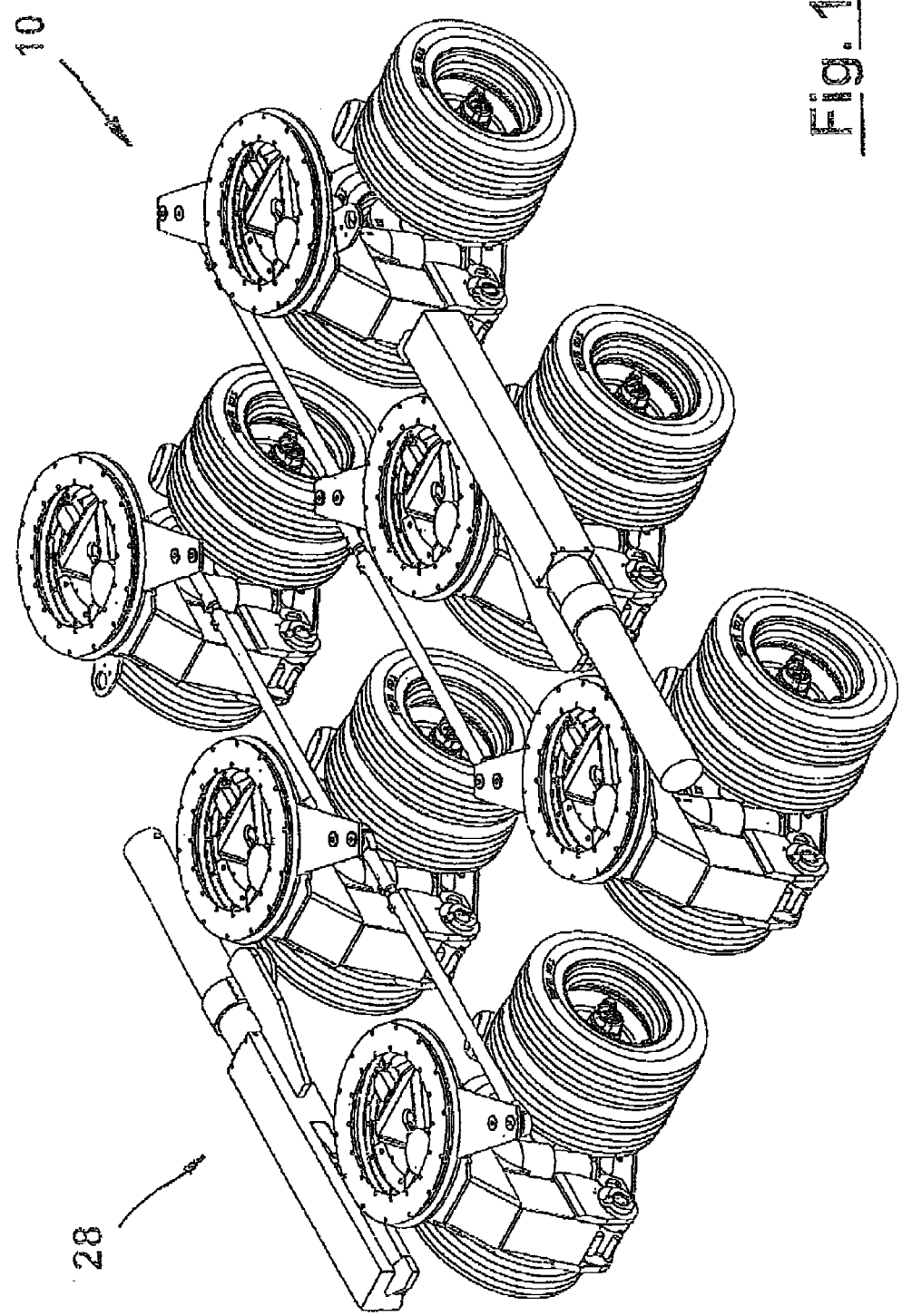
FIGS. 11 to 13 are perspective views similar to FIG. 1—but only of the crab steering device—in three different steering positions, namely FIG. 11 when driving straight ahead, FIG. 12 at a steering angle of 45° and FIG. 13 at a steering angle of 90°.
Figure 12:
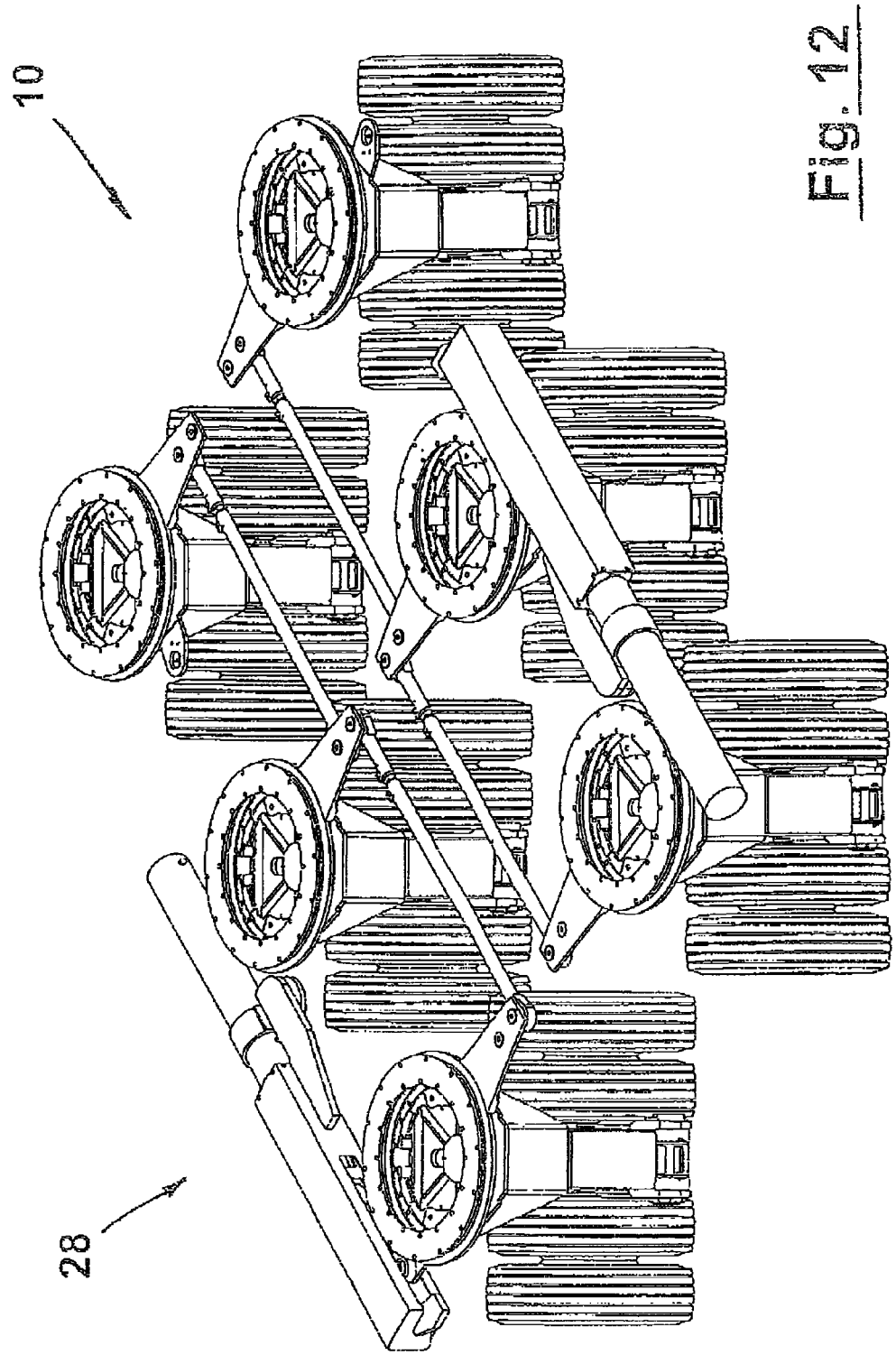
Figure 13:
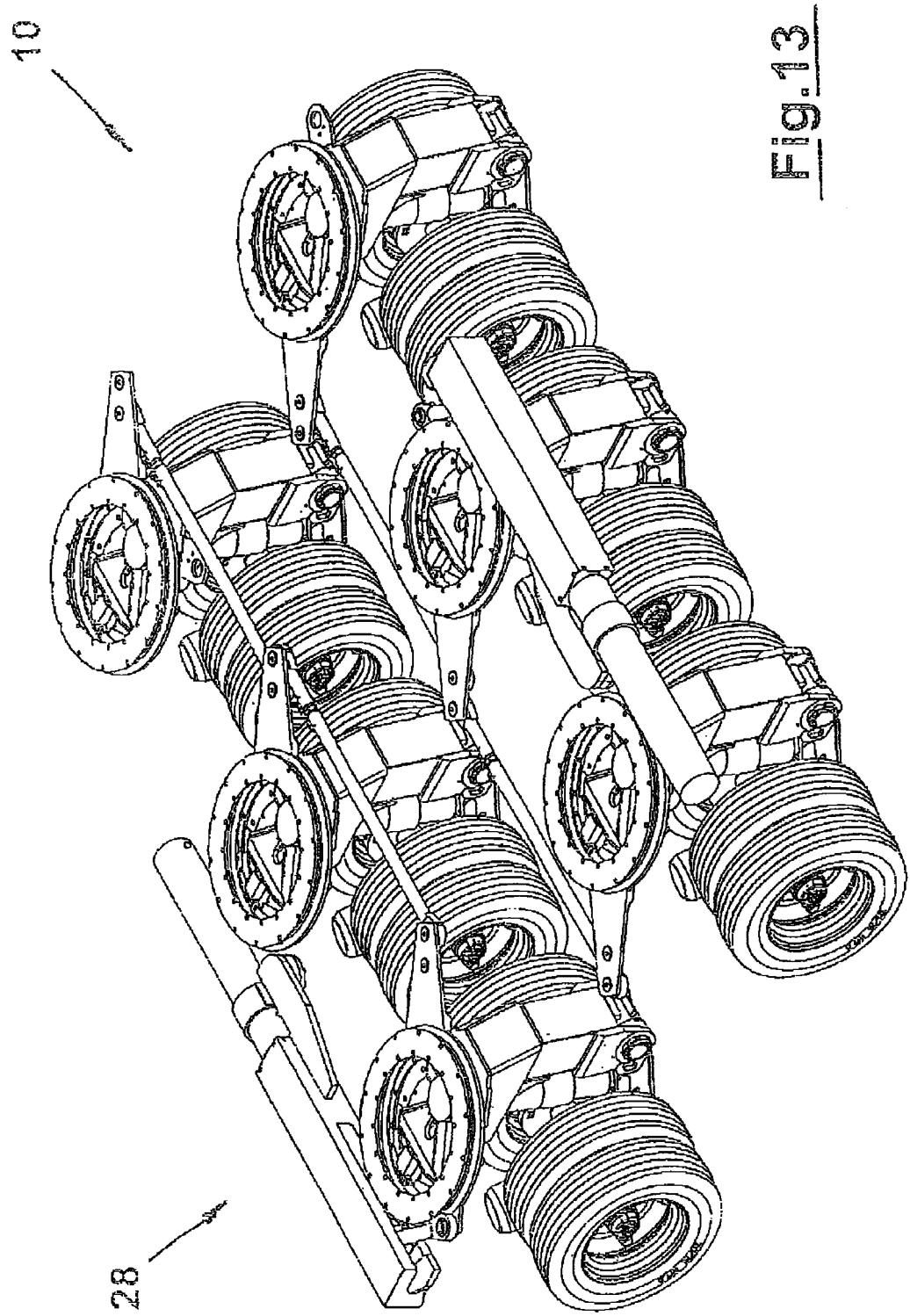

In FIG. 11 crab steering mode steering device 28 is adjusted so that the vehicle 10 drives in a straight line, i.e. all of the wheel assemblies 14, 16, 18, 20, 22, 24 have the steering angle 0°. In FIG. 12 all of the wheel assemblies have a steering angle of 45° so that the vehicle 10 drives diagonally forwards or backwards. And in FIG. 13 all of the wheel assemblies are adjusted to a steering angle of 90° so that the vehicle 10 can be moved sideways.

Figure 4:
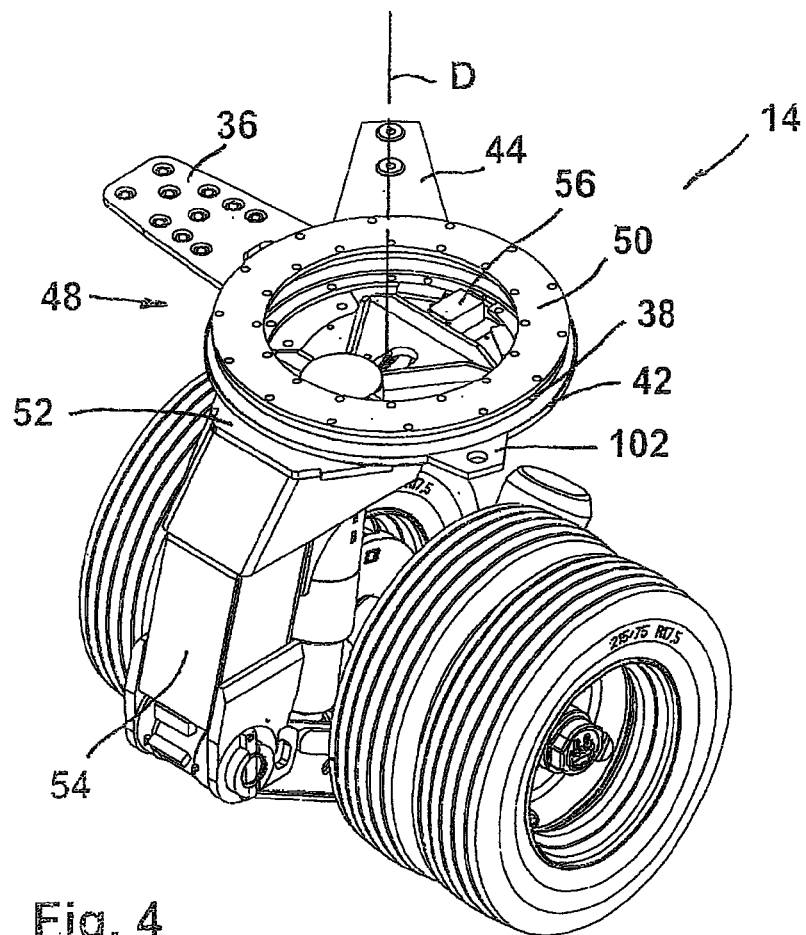
FIG. 4 is a perspective view of a single wheel assembly of the vehicle according to the invention.

As explained in the following with reference to FIG. 4, which shows the wheel assembly 14 by way of example, the wheel assemblies 14, 16, 18, 20, 22, 24 differ from the wheel assemblies which are used in conventional modular vehicles of the applicant merely on account of the structure of the stewing ring 48.

Figure 5:
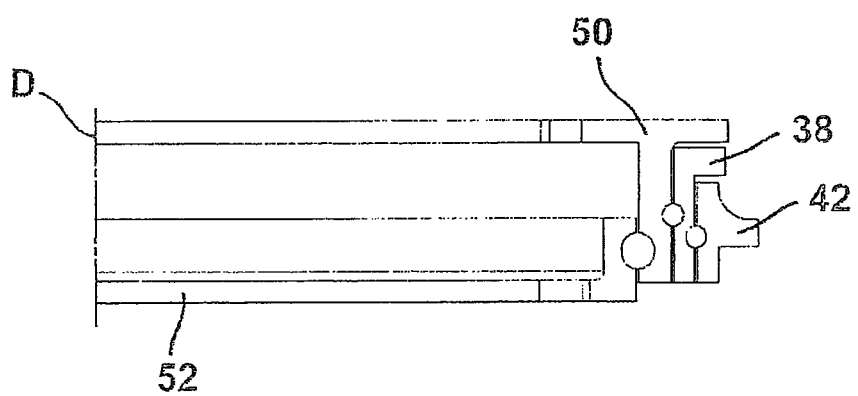
FIG. 5 is a cross section of the multiple-ball slewing ring of the wheel assembly of FIG. 4.
Figure 6:
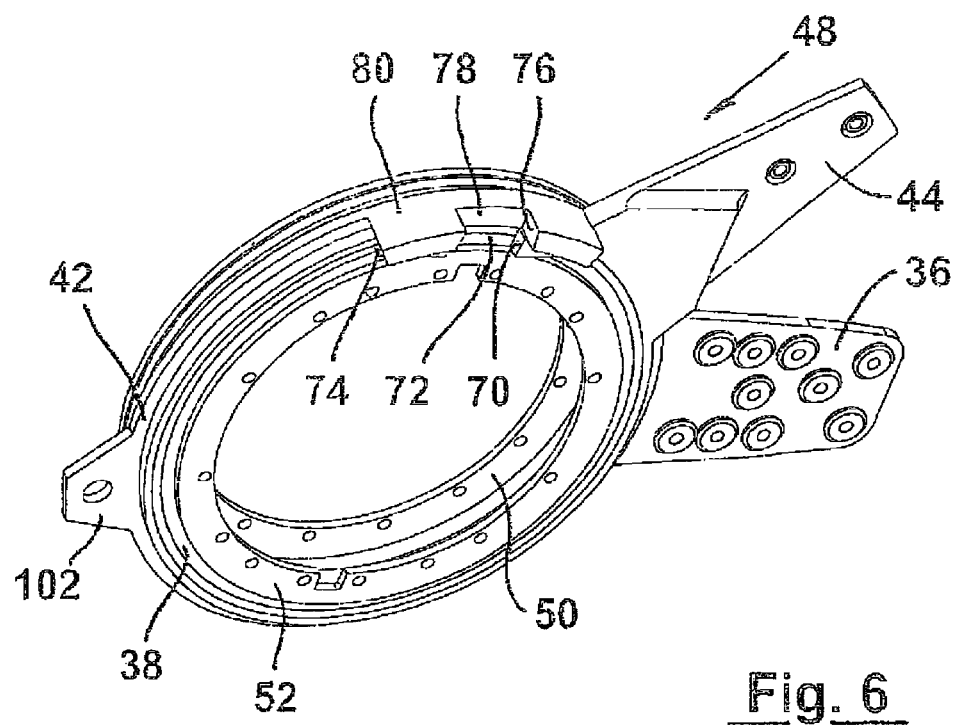
FIG. 6 is a perspective bottom view of the multiple-ball slewing ring of FIG. 5.

In particular, the slewing ring 48, which is shown again in cross section in FIG. 5 and in perspective in FIG. 6, is configured preferably as a multiple-ball slewing ring. It comprises a frame ring 50 which is secured onto the frame (not shown) of the vehicle 10, for example by screwing, riveting or the like. On the inside of the frame ring 50, the steering rotary element 52 is mounted so as to be rotatable, by means of a schematically indicated ball bearing, about the axis of rotation D of the slewing ring 48 on which the actual wheel mount 54 is secured. The latter has an identical structure to conventional wheel assemblies of the modular vehicles of the applicant and is therefore not described in more detail here. On the outside of the frame ring 50, the likewise annular steering power introduction unit 38 for the normal steering mode is mounted so as to be rotatable about the axis of rotation D by means of a schematically indicated ball bearing, and the likewise annular steering power introduction unit 42 for the crab steering mode is mounted so as to be rotatable about the axis of rotation by means of a further ball bearing, which is also only schematically indicated.

In order to switch back and forth between the normal steering mode and the crab steering mode a coupling device 56 is provided which connects the steering rotary element 52 either to the normal steering mode steering power introduction unit 38 or to the crab steering mode steering power introduction unit 42.

Figure 7:
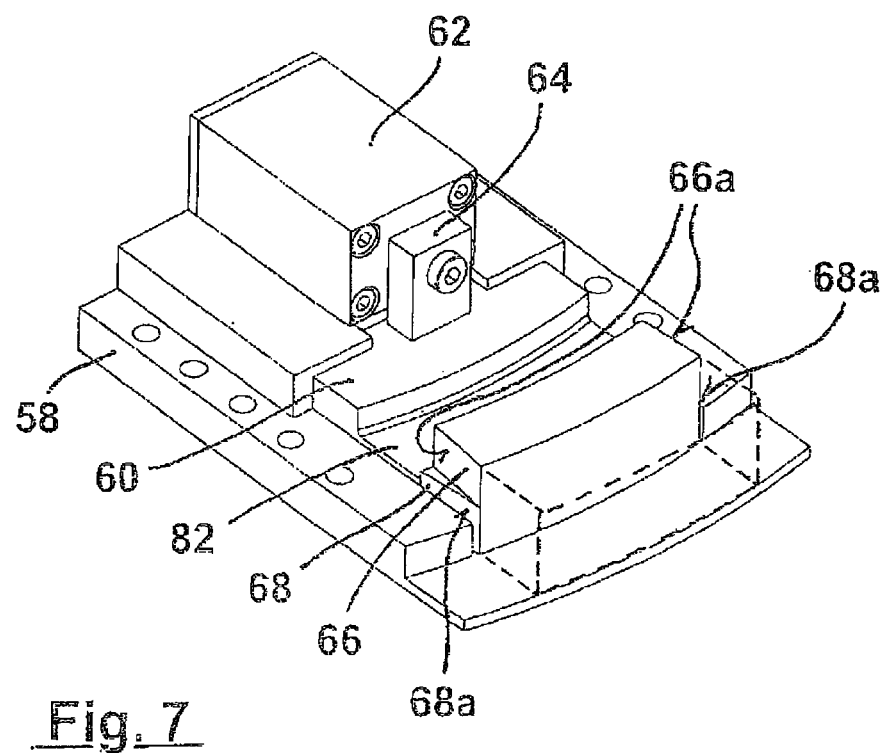
FIG. 7 is a perspective view of a coupling device of the wheel assembly of FIG. 4.

In FIG. 7 the structure of the coupling device 56 is illustrated in more detail. It comprises a base plate 58, which is securely connected, in particular is securely screwed, for example to the steering rotary element 52. A slide 60 is mounted on the base plate 58 so as to be displaceable between a first position (in FIG. 7 shown by a solid line) and a second position (in FIG. 7 indicated by a dashed line). An adjusting unit 62 is also secured to the base plate 58 and the adjusting element of the adjusting unit is connected to a tab 64 of the slide 60 in order to move said slide between the first and the second position. The adjusting unit 62 can be for example a double-acting hydraulic cylinder piston unit, the end positions of which, corresponding to the first and second positions of the slide 60, can be determined by means of proximity switches. The corresponding detecting signals can be transmitted to a central steering control unit (not shown) which in turn controls the adjusting unit 62.

The slide 60 is designed to have two engaging sections 66 and 68 arranged above one another in the vertical direction H of the vehicle 10. In this case the engaging section 66 for engaging with the lateral delimiting faces 70 of a recess 72 in an engaging tab 74 (cf. FIG. 6) of the steering power introduction unit 38 is set to the normal steering mode, whereas the engaging section 68 for engaging with the lateral delimiting faces 76 of a recess 78 in an engaging tab 80 (cf. FIG. 6) of the steering power introduction unit 38 is set to the crab steering mode. If the slide 60 is in its first position the engaging section 66 is in engagement with the engaging tab 74 of the normal steering mode steering power introduction unit 38, so that the normal steering mode steering device 26 is in steering engagement with the steering rotary element 52 and thus with the wheel mount 54. However, if the slide 60 is in its second position the engaging section 68 is in engagement with the engaging tab 80 of the crab steering mode steering power introduction unit 42, so that the crab steering mode steering device 28 is in steering engagement with the steering rotary element 52 and thus with the wheel mount 54. To ensure that the engaging tab 74 does not hinder the free rotation of the crab steering power introduction unit 42 in the second position of the slide 60, said tab does not extend as far down in vertical direction H as far as the engaging tab 80, so that it is received in a recess 82 in the slide 60 through which it can move freely.

Furthermore, it should be noted that the engaging sections 66 and 68 are provided with oblique faces 66a, 68a, which are angled in opposite directions to form a wedge, and that the associated delimiting faces 70, 76 are each configured as complementary counter oblique faces. More specifically, the oblique faces 66a of the engaging section 66 extend such that the engaging section 66 on its side facing the adjusting unit 62 is narrower than on its side facing away from the adjusting unit 62. In this way the engaging section 66 can engage with the steering power introduction unit 38 more easily during the movement of the slide 60 from the second position into the first position and can also centre said unit. Furthermore, the steering power introduction unit 38 can be configured to be play-free as a result. In a similar manner the oblique faces 68a of the engaging section 68 extend such that the engaging section 68 is narrower on its side facing away from the adjusting unit 62 than on its side facing the adjusting unit 62. In this way the engaging section 68 can engage with the steering power introduction unit 42 more easily during the movement of the slide 60 from the first position to the second position and can also centre said unit. Furthermore, the steering power introduction unit 42 can be configured to be play-free as a result.

Figure 9:
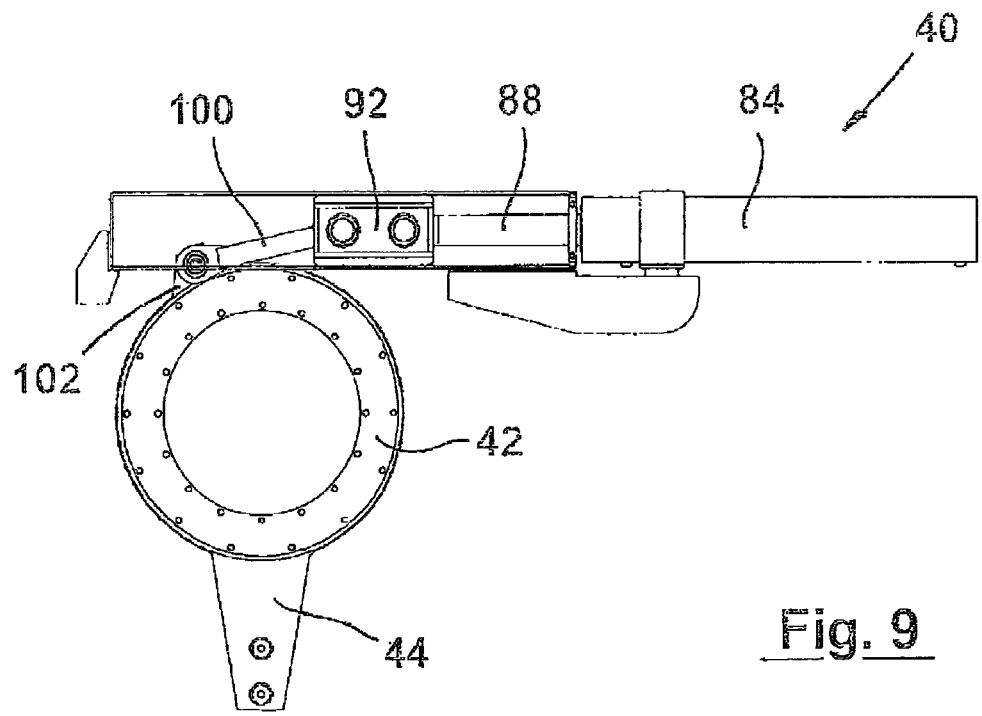

With regard to FIG. 9, the structure and the function of the power generation device 40 will now be described, which provides the steering power for the crab steering mode.

The power generation device 40 comprises a power device 84 which, in the embodiment shown, is a double-acting hydraulically actuated cylinder piston unit. In order to reduce the buckling length of the power device 84, the cylinder 86 is secured on the frame (not shown) of the vehicle 10 at 90, adjacent to the outlet end of the piston rod 88. The free end of the piston rod 88 is connected in an articulated manner to one end of a block 92 which is guided in a sliding manner in a guide 94 in the longitudinal direction of the guide 94. The guide 94 is secured on the frame (not shown) of the vehicle 10 at 96 and 98. At the other end thereof, the block 92 is connected in an articulated manner to one end of a coupling rod 100, the other end of which is connected to an attack tab 102 of the crab steering mode steering power introduction unit 42 (see also FIG. 6).

Figure 8:
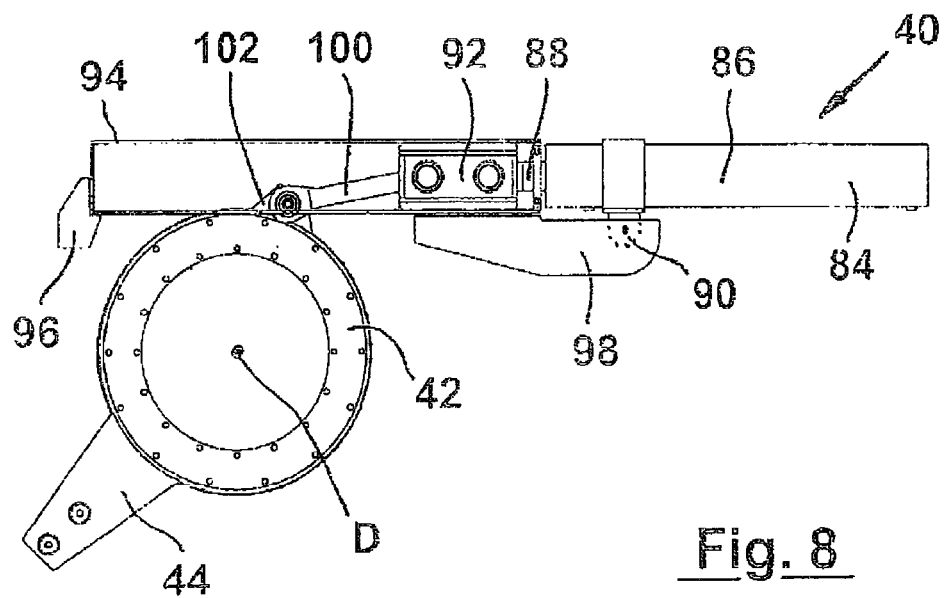
FIGS. 8 to 10 are plan views of the power device for generating the steering power required for the crab steering and the downstream mechanism for transferring said power to the crab steering power introduction unit, more particularly for three different steering positions, namely FIG. 8 when driving straight ahead, FIG. 9 at a steering angle of 45° and FIG. 10 at a steering angle of 90°.
Figure 10:
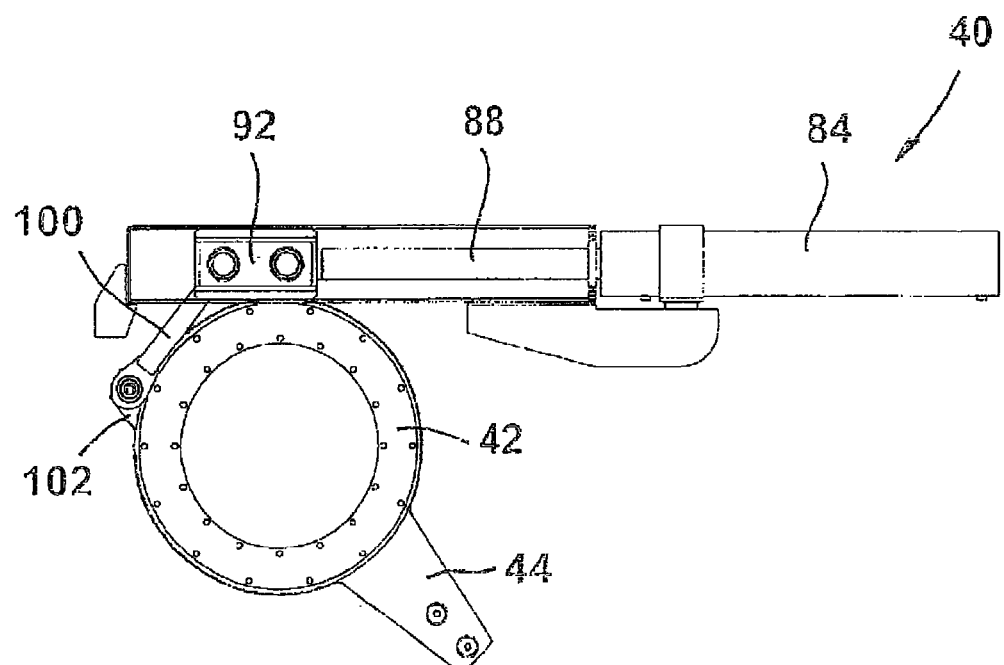

In FIG. 8, the piston rod 88 is inserted almost completely in the cylinder 86. This corresponds to a steering angle of 0°, i.e. driving in a straight line (see also FIG. 11). In FIG. 10, the piston rod 88 is extended almost completely out of the cylinder 86. This corresponds to a steering angle of 90°, i.e. driving in a transverse direction (see also FIG. 13). And in FIG. 9, the piston rod 88 is located in an intermediate position which corresponds to a steering angle of 45°, i.e. driving in an oblique direction (see also FIG. 12).

As can be seen in FIGS. 8 and 10 from the position of the connecting rod 46, which is shown as a dashed line, the available steering angle range is limited as a result of the mechanical transfer of the steering power from wheel assembly to wheel assembly by the connecting rods 46, since, in the case of a greater steering angle range, the connecting rods 46 would collide with the wheel assemblies. The steering angle range thus extends substantially from 0° to 90°. Even if at first glance this may be considered restrictive, it is completely sufficient for being able to manoeuvre the vehicle 10 in a tight space in a satisfactory manner. In addition, the steering angle range can be extended by approximately 5° to 10° by inserting or extending the piston rod 88 completely at the two ends thereof so that said range extends from approximately −10°/−5° to approximately +95°/100°, which makes manoeuvring even easier.

Figure 15:
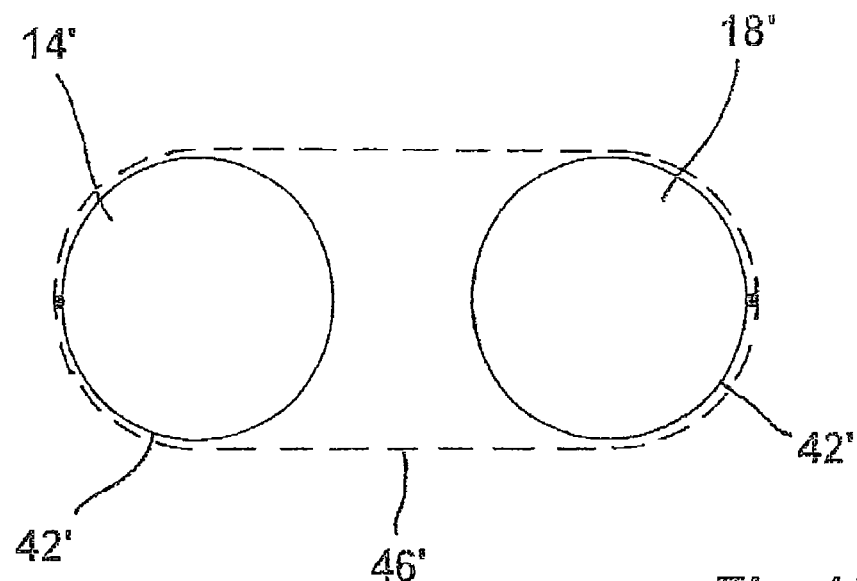
FIG. 15 is a roughly schematic view of a second embodiment of a steering system according to the invention.

It is also possible in principle to design the steering angle range to be symmetrical about the direction for driving in a straight line (steering angle 0°) so that it extends for example from −90° to +90°. This can be achieved by using connecting elements 46' which are flexible, but have an invariable length, for example chains or cables, in particular steel cables. This is shown in FIG. 15 roughly schematically and by way of example for the steering coupling of the two crab steering mode steering power introduction units 42' of the wheel assemblies 14' and 18'.

According to the above, the central concept of the present invention consists in providing a heavy goods vehicle, the steering system 12 of which, in addition to a normal steering mode steering device 26, which transfers the steering power purely mechanically by means of connecting rods 34 from axle to axle, also comprises a crab steering mode steering device 28, which transfers the steering power purely mechanically by means of connecting rods 46 from axle to axle. In this case, the individual wheel assemblies 14, 16, 18, 20, 22, 24 can be connected by means of coupling devices 56 either to the normal steering mode steering device 26 or to the crab steering mode steering device 28. However, this central concept does not necessarily need to be implemented, as has been described above with reference to FIGS. 1 to 15. In the following, therefore, a few other possible modifications will be described.

Figure 16:
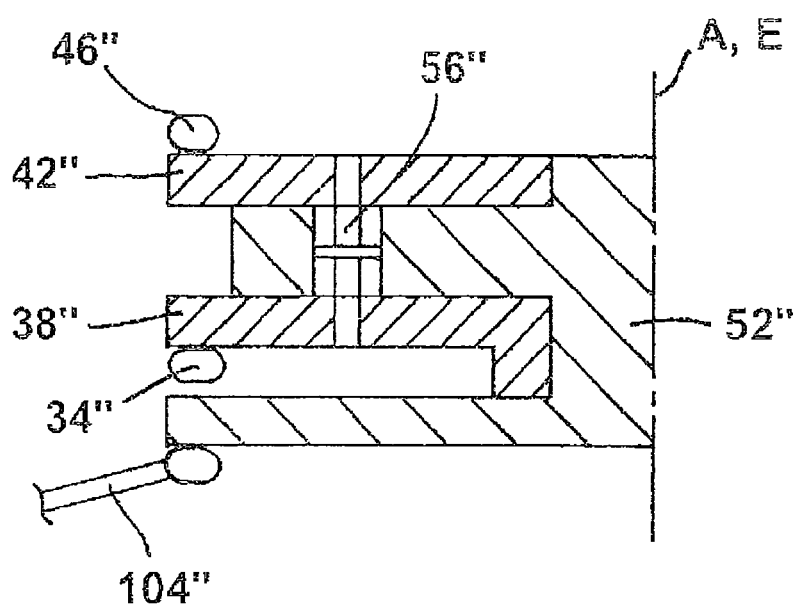
FIG. 16 is a roughly schematic view of a third embodiment of a steering system according to the invention.

With reference to the embodiment according to FIG. 16, it should be clarified that the construction principle according to the invention can also be implemented in a steering system, as is described for example in DE 10 2012 205 641, i.e. a steering system in which a common steering rotary element 52" is assigned to the left and right wheel assemblies of the same axle. The axis of rotation A of said steering rotary element 52" extends in the longitudinal median plane E of the vehicle. According to FIG. 16, the steering power introduction unit 38" for the normal steering mode and the steering power introduction unit 42" for the crab steering mode can be rotatably mounted on the steering rotary element 52". Furthermore, the steering rotary element 52" can be equipped with a coupling device 56" which connects the steering rotary element 52" either to the steering power introduction unit 38" for the normal steering mode or to the steering power introduction unit 42" for the crab steering mode. In this way, steering power supplied by the connecting rod 34" for the normal steering mode or by the connecting rod 46" for the crab steering mode can be transferred by means of the assigned steering power introduction unit 38" or 42" to the steering rotary element 52" and from there by means of the steering track rods 104" to the associated wheel assembly.

Figure 17A:
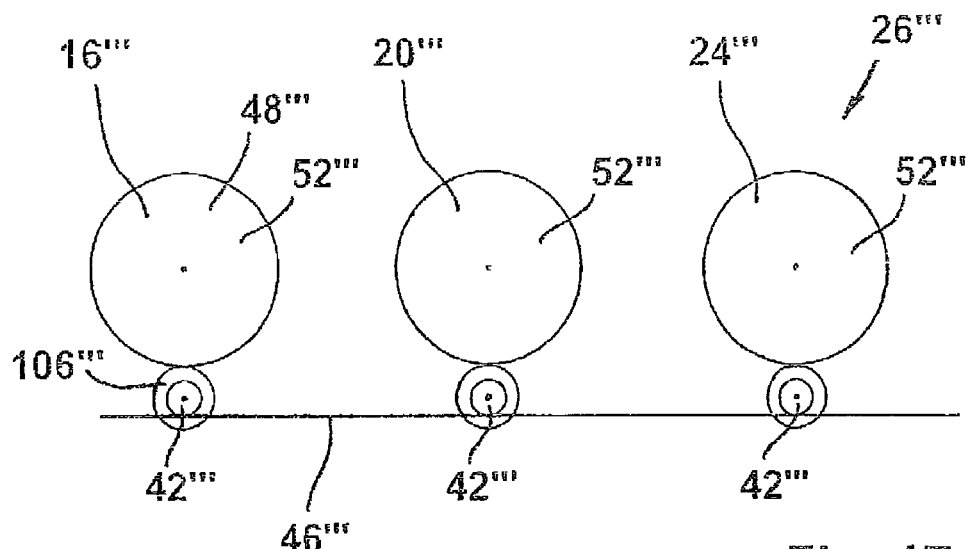
FIGS. 17*a* to 17*c* are roughly schematic views of a fourth embodiment of a steering system according to the invention.
Figure 17B:
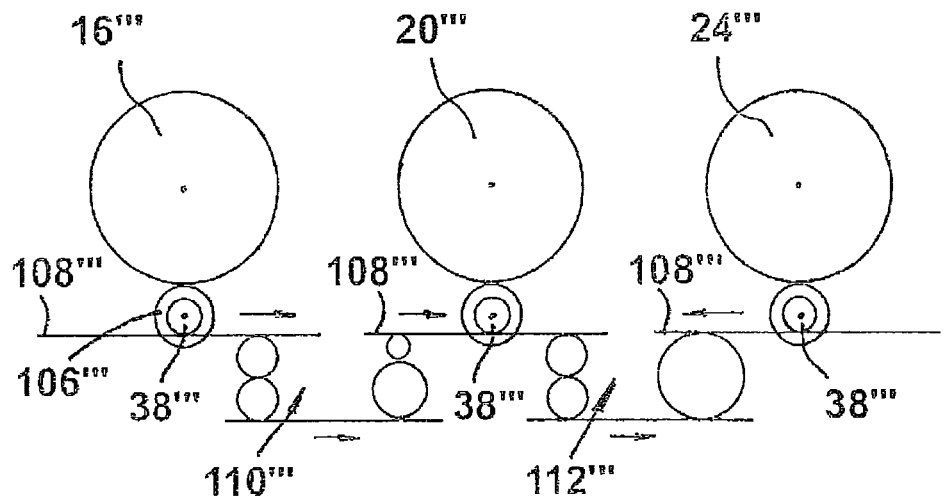
Figure 17C:
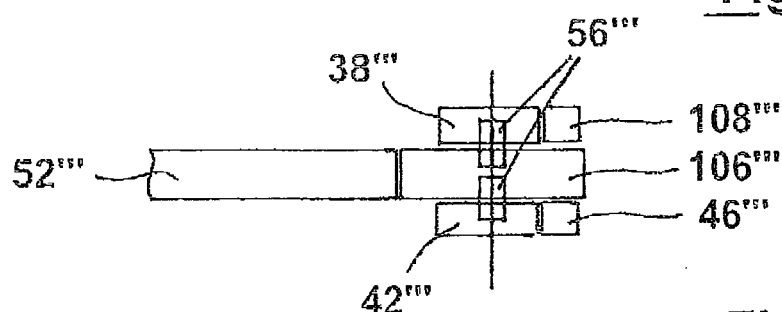

In FIGS. 17a, 17b and 17c, lastly a roughly schematic diagrammatic sketch of another embodiment is shown, in which the normal steering mode steering device 26''' (see FIG. 17b) and the crab steering mode steering device 28''' (see FIG. 17a) are formed in a rack-and-pinion design.

The crab steering mode steering device 28''' comprises a continuous gear rack 46''' which interconnects the three wheel assemblies 16''', 20''', 24'''. A pinion 42''' is assigned to each of these wheel assemblies, which pinion meshes with the gear rack 46''' and transfers the steering power picked up thereby to the steering rotary element 52'''. As shown in FIG. 17c, the pinion 42''' can be connected to a pinion 106''', which meshes with a gear rim of the steering rotary element 52''', by means of a coupling device 56''' for conjoint rotation. If the pinion 106''' has a greater diameter than the pinion 42''', a smaller longitudinal movement of the gear rack 46''' can be translated into a larger rotational movement of the steering rotary element 52'.

The normal steering mode steering device 26''' differs from the crab steering mode steering device 28''' in that instead of the one continuous gear rack 46''', a plurality of gear racks 108''' is provided, each of which mesh with a pinion 38''' which can optionally be connected by means of a coupling device 56''' to the pinion 106''' meshing with the steering rotary element 52'''. Adjacent gear racks 108''' are interconnected by means of gear assemblies 110''' and 112' which are formed according to FIG. 17b for example of rack-and-pinion assemblies. By selecting the pinion appropriately, said rack-and-pinion assemblies can maintain the steering direction of rotation from wheel assembly to wheel assembly (gear assembly 110''') or reverse it (gear assembly 112'''). Furthermore, said assemblies can change the translation ratio (change in angle of rotation of the steering rotary element 52''' per unit length of the displacement movement of the gear rack 108''') from wheel assembly to wheel assembly to an extent predetermined for example by the Ackermann principle. Since the coupling device 56''' is arranged in front of the actual wheel assembly, in this embodiment, conventional single rotary rings 48''' can be used.

The invention claimed is:

1. Heavy goods vehicle comprising:
   a plurality of axles, each of which comprises at least one left wheel assembly and at least one right wheel assembly,
   a steering system, which is configured so that it enables:
      both a normal steering mode in which the left wheel assemblies and the right wheel assemblies each have a steering angle which is dependent on a position of the respective axle in a longitudinal direction of the vehicle, the wheel assemblies of adjacent axles having a different steering angle from one another,
      and a crab steering mode in which the wheel assemblies assigned to the plurality of axles all have the same steering angle,
   wherein the steering system comprises for each axle:
      at least one steering rotary element which is rotatable about an axis of rotation and is in steering connection with the at least one left wheel assembly and/or the at least one right wheel assembly of the axle,
      for each steering rotary element a normal steering mode steering power introduction unit assigned thereto,
      for each steering rotary element a crab steering mode steering power introduction unit assigned thereto,
      for each steering rotary element a coupling device, which connects the steering rotary element either to the normal steering mode steering power introduction unit or to the crab steering mode steering power introduction unit in a rotationally engaged manner,
   wherein, when the coupling device connects the steering rotary element to the normal steering mode steering power introduction unit, the steering rotary element is not connected by the coupling device to the crab steering mode steering power introduction unit, and
   wherein the steering system further comprises:
      at least one normal steering mode connecting element, which mechanically connects the normal steering mode steering power introduction units of axles that are adjacent to one another in the longitudinal direction of the vehicle,
      at least one crab steering mode connecting element, which mechanically connects the crab steering mode steering power introduction units of axles that are adjacent to one another in the longitudinal direction of the vehicle, and
      at least one power device which is arranged on the vehicle and is connected to at least one of the steering power introduction units and provides the steering power.

2. Heavy goods vehicle according to claim 1, wherein the normal steering mode steering power introduction unit comprises a normal steering mode rotary element assigned to the respective steering rotary element,
- wherein the crab steering mode steering power introduction unit comprises a crab steering mode rotary element assigned to the respective steering rotary element, and
- wherein the coupling device connects the steering rotary element in a rotationally engaged manner either to the normal steering mode rotary element or to the crab steering mode rotary element.

3. Heavy goods vehicle according to claim 2, wherein at least one steering rotary element is part of a rotary frame which also comprises a frame element which is operatively arranged on the frame of the vehicle, the steering rotary element being mounted on the frame element so as to be rotatable about the axis of rotation of the steering rotary element,
- the rotary frame also comprises the normal steering mode rotary element and the crab steering mode rotary element, the normal steering mode rotary element and the crab steering rotary element being arranged on the frame element so as to be rotatable indirectly or directly about the axis of rotation.

4. Heavy goods vehicle according to claim 1, further comprising a separate steering rotary element being assigned in each case to the left wheel assemblies and the right wheel assemblies of an axle.

5. Heavy goods vehicle according to claim 1, wherein the at least one normal steering mode steering power introduction unit comprises a normal steering mode steering lever to which the at least one normal steering mode connecting element is connected, and/or in that the at least one crab steering mode steering power introduction unit comprises a crab steering mode steering lever to which the at least one crab steering mode connecting element is connected.

6. Heavy goods vehicle according to claim 5, wherein, when driving in a straight line, the normal steering mode steering lever and the crab steering mode steering lever are arranged on a side of the steering rotary element pointing towards a longitudinal center of the vehicle.

7. Heavy goods vehicle according to claim 1, wherein the coupling device comprises an adjusting unit, which is securely connected to the steering rotary element, as well as a slide which can be moved by the adjusting unit relative to the steering rotary element between a first position and a second position,
- the slide comprising a first engaging section and a second engaging section, the first engaging section, in the first position of the slide, being in steering power transmission engagement with one of the steering power introduction units,
- whilst the second engaging section, in the second position of the slide, is in steering power transmission engagement with the respective crab steering mode steering power introduction unit or the respective normal steering mode steering power introduction unit.

8. Heavy goods vehicle according to claim 7, wherein the slide further comprises a recess adjacent to one of the two engaging sections, which recess enables a free movement of the other steering power introduction unit when said engaging section is in steering power transmission engagement with the associated steering power introduction unit.

9. Heavy goods vehicle according to claim 7, wherein the first engaging section and the second engaging section are arranged above one another in a vertical direction of the vehicle.

10. Heavy goods vehicle according to claim 7, wherein at least one of the engaging sections is designed to have oblique faces which cooperate with corresponding counter oblique faces of the assigned steering power introduction unit.

11. Heavy goods vehicle according to claim 1, wherein at least one power device is provided for producing the required steering power for the normal steering mode and the crab steering mode.

12. Heavy goods vehicle according to claim 11, wherein a separate power device is assigned to the left wheel assemblies of the vehicle and the right wheel assemblies of the vehicle for generating the steering power required for the crab steering mode.

13. Heavy goods vehicle according to claim 11,
- wherein the power device is one of:
  - a hydraulically actuated cylinder piston unit, and
  - a cylinder piston unit.

14. Heavy goods vehicle according to claim 13, wherein the cylinder is mounted on the frame of the vehicle adjacent to a piston rod outlet end thereof.

15. Heavy goods vehicle according to claim 14, wherein the cylinder is arranged to pivot relative to the frame of the vehicle.

16. Heavy goods vehicle according to claim 13, wherein a free end of a piston rod is connected to a guide block which can be movably guided in a guide which is secured on the frame, the guide block being connected to one end of a connecting rod, the other end of which is connected to the steering power introduction unit.

17. Heavy goods vehicle comprising
- a plurality of axles, each axle comprising at least one left wheel assembly and at least one right wheel assembly;
- a steering system configured to enable, for the left wheel assemblies and the right wheel assemblies:
  - a normal steering mode in which said wheel assemblies each have a steering angle which is dependent on a position of the respective axle in a longitudinal direction of the vehicle, the wheel assemblies of adjacent axles having a different steering angle from one another, and
  - a crab steering mode in which said wheel assemblies all have a same steering angle,
- wherein each said axle is steered utilizing:
  - at least one steering rotary element which is rotatable about an axis of rotation and is in steering connection with at least one of:
    - at least one left wheel assembly; and/or
    - at least one right wheel assembly,
  - a normal steering mode steering power introduction unit associated with the at least one steering rotary element;
  - a crab steering mode steering power introduction unit associated with the at least one steering rotary element; and
  - a coupling device configured to connect the steering rotary element either to the normal steering mode steering power introduction unit or to the crab steering mode steering power introduction unit in a rotationally engaged manner,
- wherein the axles are connected to one another via a steering system that comprises:
  - at least one normal steering mode connecting element mechanically connecting the normal steering mode steering power introduction units of axles adjacent to one another in a longitudinal direction of the vehicle,
  - at least one crab steering mode connecting element mechanically connecting the crab steering mode steering power introduction units of axles adjacent to one another in the longitudinal direction of the vehicle, and at least one power device arranged on the vehicle, being connected to at least one of the steering power introduction units, and being configured to provide steering power, wherein, when the coupling device connects the steering rotary element to the normal steering mode steering power introduction unit, the steering rotary element can rotate relative to the crab steering mode steering power introduction unit.

18. Heavy goods vehicle comprising a plurality of axles each comprising left and right wheel assembles;

each said axle being configured to assume:
- a normal steering mode in which said wheel assemblies each have a steering angle which is dependent on a position of the respective axle in a longitudinal direction of the vehicle, wherein the wheel assemblies of adjacent axles can be configured to have different steering angles, and
- a crab steering mode in which said wheel assemblies all have a same steering angle, wherein each said axle is steered utilizing:
- at least one steering rotary element which is rotatable about an axis of rotation and is in steering connection with at least one of:
  - a left wheel assembly; and/or
  - a right wheel assembly,
- a normal steering mode steering power introduction unit which can rotate about the axis of rotation and is associated with the at least one steering rotary element,
- a crab steering mode steering power introduction unit which can rotate about the axis of rotation and is associated with the at least one steering rotary element,
- a coupling device configured to selectively couple the steering rotary element with the normal steering mode steering power introduction unit in a rotationally engaged manner the coupling device also configured to selectively couple the steering rotary element with the crab steering mode power introduction unit in a rotationally engaged manner, wherein said axles are connected to one another via a steering system that comprises:
- at least one normal steering mode connecting rod connecting the normal steering mode steering power introduction units of adjacent axles to one another,
- at least one crab steering mode connecting rod connecting the crab steering mode steering power introduction units of adjacent axles to one another, and
- at least one power device arranged on the vehicle, being connected to at least one of the steering power introduction units, and being configured to provide steering power.

* * * * *